March 3, 1964
R. F. KREGEL
3,122,925
APPARATUS AND METHOD FOR THE EXAMINATION OF
FREE FLOWING SOLID MATERIALS
Filed Nov. 10, 1960
2 Sheets-Sheet 1
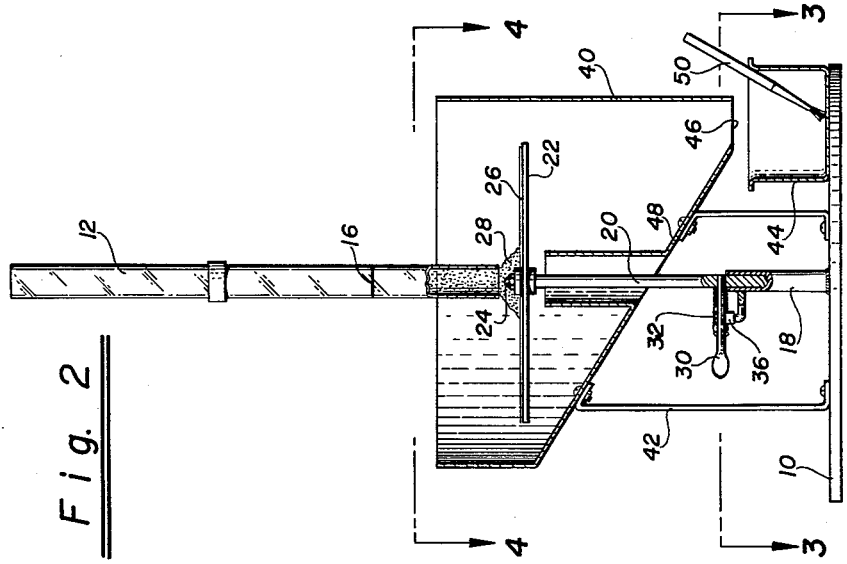
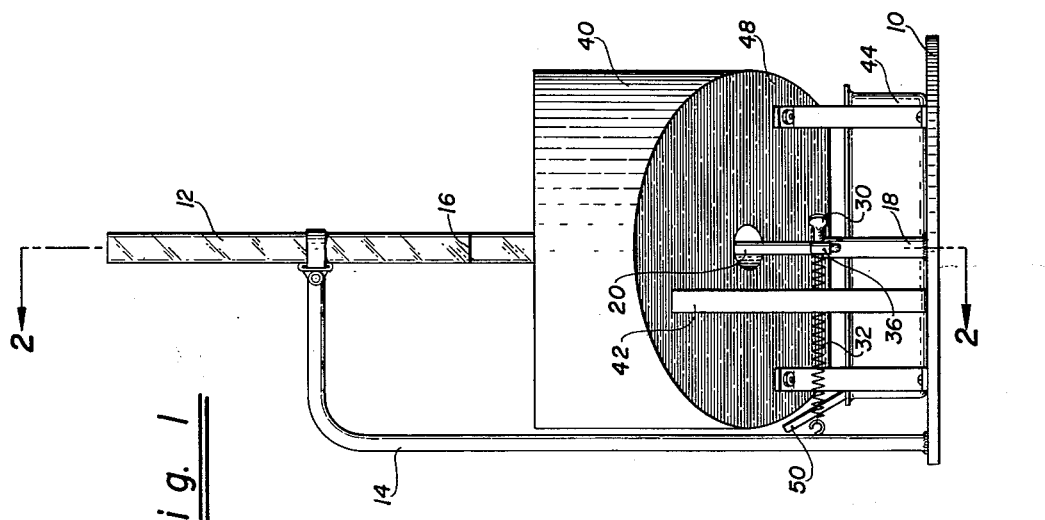
INVENTOR.
Richard F. Kregel
BY
Attorneys March 3, 1964 R. F. KREGEL 3,122,925
APPARATUS AND METHOD FOR THE EXAMINATION OF
FREE FLOWING SOLID MATERIALS
Filed Nov. 10, 1960 2 Sheets-Sheet 2

INVENTOR.
Richard F. Kregel
BY
Attorneys

United States Patent Office 3,122,925
Patented Mar. 3, 1964

3,122,925
APPARATUS AND METHOD FOR THE EXAMINATION OF FREE FLOWING SOLID MATERIALS
Richard F. Kregel, Woodland, Calif., assignor to American Sugar Company, Jersey City, N.J., a corporation of New Jersey
Filed Nov. 10, 1960, Ser. No. 68,539
8 Claims. (Cl. 73—432)

This invention relates generally to procedures for determining the speck content of free flowing, solid materials, and particularly relates to a method and apparatus for determining the speck content of free flowing, solid chemical compositions of high purity such as granulated sugar, table salt, industrial chemicals in granular or powder form and the like.

In the sugar industry, it is customary to grade granulated sugar with regard to speck content. The needs of the industry require a quick indicative test of sufficient accuracy for laboratory use but capable also of being performed rapidly at the various factory stations by relatively untrained personnel. The methods employed heretofore have not satisfied these requirements; they have either required too much time to perform or have not been sufficiently accurate. By way of illustration, one method presently employed involves the visual inspection of a stream of moving sugar crystals. Counting specks by this standard method not only involves eye strain but generally requires eight to ten minutes for the customary 50-gram sample. Moreover, a thin sample layer of single particle thickness necessary for accurate speck observation is difficult to achieve for a sample of this size.

Similar problems are involved in other industrial processes, such as the manufacture of table salt, dehydrated fruit crystals or dairy products, and so on.

It is a general object of the present invention to provide what now seems a simple solution to the above problems, and more specifically to provide a rapid simplified test procedure and apparatus for determining the speck content of various free-flowing materials.

It is a further object of the invention to provide a test method and apparatus which can be employed to determine the speck content of granulated sugar and other free-flowing solid materials in a fraction of the time heretofore required.

Another object of the invention is to provide apparatus for the purpose described which is simple in construction, portable, and capable of being successfully operated by inexperienced personnel.

Another object of the invention is to provide a sensitive accurate test apparatus for the purpose described which can be constructed at very low cost.

Other objects and advantages of the invention will be apparent from the following description of a specific embodiment thereof, and from the drawings in which:

FIGURE 1 is a view in elevation of test apparatus embodying the invention;

FIGURE 2 is a view in vertical section along the line 2—2 of FIGURE 1;

Figure 4:
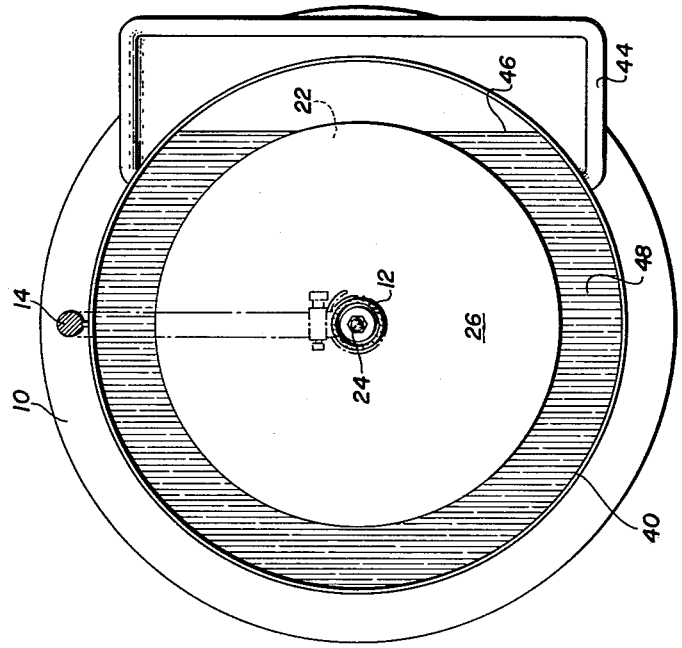
FIGURE 4 is a like view along the line 4—4 of FIGURE 2.
Figure 3:
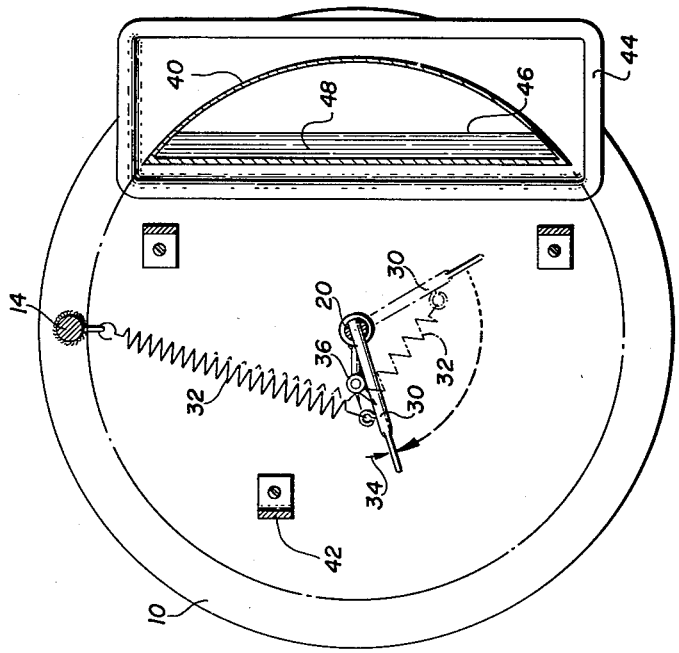
FIGURE 3 is a view in horizontal section along the line 3—3 of FIGURE 2.

Generally stated, the present invention makes use of a hollow open ended vertical column having its lower end spaced a slight distance above a rotary horizontal disk. The spacing and the internal dimensions of the column are such that a predetermined amount of granulated sugar or similar free-flowing material can be supported in vertical relationship above the disk. Means are provided to gradually apply a potential centrifugal force to the disk, and to permit this applied force to be released to produce rapid rotary acceleration. Means are also provided to abruptly stop the rotary motion of the disk. The result is to spread the sugar or other free-flowing material thinly over the upper surface of the disk in a layer of substantially uniform thickness. The number of specks in the material can thereafter be counted and graded as to size and color intensity.

Upon completing the speck count of the first portion of the sample, the potential centrifugal force is again applied to the rotary disk and, upon release, the sample portion previously examined will be spun off the disk by centrifugal force and additional sample spread upon its surface. To avoid accidental re-counting of specks between spread portions of sample, the specks can be separately removed (by brushing or sucking into a tube by vacuum) prior to actuating the disk. Rotation of the disk will consequently spread additional sugar for observation onto a speck free surface, simultaneously with removal and collection of the sample already examined in a suitable receptacle.

The embodiment of the invention illustrated in the drawing comprises a base 10 mounting a hollow open ended column 12 by means of an upstanding support 14. Preferably the column 12 is fabricated of glass, plastic or other suitable material providing the necessary dimensional accuracy and facilitating visual observation of its interior. At its lower end the column may be provided with a marking 16 calibrated to a predetermined internal volume of the column (between the marking and the lower end of the column) corresponding to a desired quantity of material to be tested.

As best illustrated in FIGURE 2, the base carries an upstanding support or bearing 18 for rotatably mounting a spindle 20. At its upper end, the spindle carries a horizontal substantially planar disk 22. Suitable means are provided, as at 24, to insure rotation of the disk with the spindle, and also to permit replacement of a layer of coarse paper or other material 26 forming the upper surface of the disk.

It will be noted that the open lower end of the column 12 is spaced a slight distance above the upper surface of the disk 22. This distance should be sufficient to permit a small amount of the free-flowing material to flow out of the lower end of the column onto the disk as indicated by the dotted lines at 28. Satisfactory results are obtained if the spacing between the tube and the disk is between about ⅙ to ½₂ the internal diameter of the column, for all diameters up to about 2 inches. By way of illustration, satisfactory results have been obtained by use of a column 1 inch in internal diameter spaced approximately ⅛ inch above the surface of the disk.

It is a feature of the invention that the disk 22 is mounted so that it can be very rapidly accelerated into rotary motion, and then abruptly stopped. This is accomplished in the illustrated apparatus by means of a radially extending lever 30 rigidly secured to the spindle 20. Resilient means such as the spring 32 are secured between the outer end of the lever and appropriate means on the base, for example the upstanding support 14. The spring 32 normally biases the lever into engagement with a stop 36, which may be conveniently provided as a component part of the upstanding bearing 18.

Upon pivoting the lever 30 about its axis against the tension of the spring 32, a substantial potential centrifugal force can be applied to the rotary disk 22. Upon release of the lever, the spring will cause the lever to rapidly accelerate the disk on its axis until such time as the lever again contacts the stop 36, at which time rotary motion will be abrupting stopped. The effect of this operation is to cause the free-flowing material at 28 and additional material in the lower end of the column to be spun outwardly in a thin layer on the upper surface of the disk. Moreover, the combined action causes the free-flowing material to be deposited in a layer which is of a thickness no greater than the individual particles of the test material. This permits a rapid visual indication of any specks within the material beyond the immediate area of the disk near the sample holding column.

To facilitate carrying out a series of tests in rapid succession, a housing 40 is preferably positioned above the base so as to surround the lower end of the column 12 and the rotary disk 22. The housing 40 may be mounted in any suitable fashion, for example, by the upstanding supports 42, and may be spaced above the base to permit positioning of a container 44 for material being discharged from the housing through a lower opening 46. As illustrated, the lower wall 48 of the housing slopes toward the outlet 46 to insure that all material discharged will pass into the container 44.

The operation of the illustrated apparatus in carrying out the method of the invention can now be summarized as follows:

Assuming a test procedure related to granulated sugar, a predetermined quantity of the sugar (e.g., 50 grams) is introduced to the column 12 through the upper open end. For convenience, and to eliminate the necessity of weighing the sample, the marking 16 on the column can be calibrated in relation to the internal volume of the column and the amount of sugar retained within the zone 28. The test operator now grasps the lever 30 and pivots it counterclockwise a predetermined amount against the tension of the spring 32. Upon releasing the lever, the sugar is spun outwardly in a thin even layer over the disk in reproducible fashion. The operator now counts the observable specks, noting with a suitable grade mark the size and color intensity of each speck before removing the specks from the disk with the brush 50. This procedure is repeated until all of the sample in the column has been spun off the disk. Under ordinary circumstances, this procedure requires about 1 to 3 minutes. The sugar spun outwardly from the disk collects in the container 44. The brush (or a suction tube) enables the operator to remove the specks from the upper surface of the disk after examination, thereby preventing any re-counting of specks throughout the test.

I claim:

1. In an apparatus for determining the speck content of free-flowing finely divided materials, a hollow open ended substantially vertical column, a disk mounted closely adjacent a lower end of said column but spaced therefrom, said disk being disposed in a horizontal plane, and means mounting said disk for successive rapid rotary acceleration and deceleration about its own axis, whereby predetermined amounts of finely divided material within the column can be caused to flow over the surface of the disk in a thin layer of substantially uniform thickness.

2. In an apparatus for determining the speck content of free-flowing finely divided materials, a hollow open ended substantially vertical column, said column being calibrated as to internal volume, a disk mounted closely adjacent a lower end of said column but spaced a predetermined distance therefrom, said disk being disposed in a horizontal plane, and means mounting said disk for successive rapid rotary acceleration and deceleration about its own axis, whereby predetermined amounts of finely divided material within the column can be caused to flow over the surface of the disk in a thin layer of substantially uniform thickness.

3. In apparatus for determining the speck content of free-flowing granular materials, a hollow open ended vertical column, said column being supported on a base, an upstanding spindle mounted on said base for rotary movement about an axis coincident to the axis of said column, a disk carried by the upper end of said spindle, said disk being closely adjacent the lower end of said column but spaced therefrom, said disk being disposed in a horizontal plane, and means cooperating with the spindle to rapidly accelerate the same into rotary motion and thereafter to abruptly arrest said rotary motion, such rotary motion causing a predetermined amount of granular material to descend from within the column and to flow evenly over the surface of the disk to form a thin layer of substantially uniform thickness.

4. Apparatus as in claim 3 wherein said means to rapidly accelerate and decelerate said spindle comprises a radially extending lever carried by said spindle, resilient means secured between said lever and means supported on the base, and stop means adapted to arrest pivotal movements of said lever imparted by said resilient means.

5. Apparatus as in claim 3 wherein a housing is positioned about said rotary disk to receive granular material discharged therefrom upon rotary movement of said disk.

6. In apparatus for determining the speck content of granulated sugar and like materials, a base, an upstanding support, a hollow open ended vertical column carried by said support in spaced relation above the base, a portion of said column being calibrated as to internal volume, upstanding bearing means carried by said base, a spindle mounted in said bearing means for rotary movements below said column, a disk supported by the upper end of said spindle in spaced relation below said column, said disk being disposed in a horizontal plane, a radially extending lever carried by said spindle, spring means secured between said lever and the base whereby rotary motion can be imparted to said disk, and stop means carried by the base and adapted to engage said lever to abruptly stop rotary motion of said disk.

7. In a method of determining the speck content of granulated sugar and like materials, the steps of confining a predetermined quantity of granulated material in a vertical column above and in contact with a horizontal planar support, rapidly accelerating the support into rotary motion about an axis coincident with that of the vertical column, and abruptly stopping said rotary motion to cause material within the column to spread radially outward onto the support in a thin layer of substantially uniform thickness, whereby visual access to successive substantially equal proportions of said granulated material can be obtained in rapid succession.

8. In a method of determining the speck content of granulated sugar and like granular materials, the steps of confining a predetermined quantity of granular material in a vertical column above and in contact with a horizontal planar support, slowly applying a predetermined potential centrifugal force on said planar support, releasing said potential centrifugal force to thereby rapidly accelerate the support into rotary motion about an axis coincident with that of the vertical column, abruptly stopping the rotary motion of said planar support to cause material within the column to spread radially outward onto the support in a thin layer of substantially uniform thickness and removing the specks from said layer.

References Cited in the file of this patent

UNITED STATES PATENTS

| | | |
|---|---|---|
| 270,368 | Barlow | Jan. 9, 1883 |
| 2,329,900 | Hermann | Sept. 21, 1943 |